United States Patent Office 3,075,940
Patented Jan. 29, 1963

3,075,940
PLASTICIZED VINYL CHLORIDE POLYMER STABILIZED WITH A BISPHENOL COMPOUND
Henry John Pazinski, Fords, Ernest Edward Griesser, North Plainfield, and Warren Joseph Frissell, Jr., Plainfield, N.J., assignors to Union Carbide Corporation, a corporation of New York
No Drawing. Filed Jan. 17, 1958, Ser. No. 709,474
16 Claims. (Cl. 260—31.8)

This invention relates to plasticized vinyl chloride resin compositions stabilized with a bisphenol compound.

The increasing use of vinyl chloride resins has created a large demand for plasticizers which are capable of rendering such resins more pliable and easier to process. It is known that hard, horny vinyl chloride resins can be rendered soft, flexible, extensible, and more or less rubbery like in character by the addition thereto of monomeric ester plasticizers. Vinyl chloride resin compositions containing monomeric ester plasticizers are easily processed, readily worked and can be molded or extruded or otherwise formed into useful products. Materials made therefrom, such as sheets and films, are supple, flexible and strong.

The use of vinyl chloride resins particularly those containing a monomeric ester plasticizer, however, has been limited despite the high mechanical effectiveness of the aforementioned plasticizers because of the instability of these resin compositions during prolonged high temperature aging and end use, especially in electrical applications. At high temperatures the strength characteristics, electrical properties and the like are degraded and the utility of the compositions is thereby seriously limited. In addition vinyl chloride resins plasticized with the aforementioned plasticizers have a pronounced tendency to lose their color characteristics on high temperature aging.

The degradation or deterioration of these vinyl chloride resin compositions has been generally attributed to the known inherent instability of the vinyl chloride resins due to dehydrochlorination and oxidation. Actually, however, this stability problem is believed to be two fold in nature in that (1) the vinyl chloride resins themselves have limited stability and decompose, undergoing property degrading changes particularly at high temperatures. This deterioration has been attributed to elimination of hydrogen chloride from the resin followed by an acid catalyzed oxidative attack on the unsaturated linkages formed as a result of the dehydrochlorination reaction.

The problem relating to the degradation of vinyl chloride resins is more pronounced whenever the resin is being compounded at high temperatures in iron metal apparatus. The hydrogen chloride liberated from the resin at high temperatures reacts with the iron surfaces of the compounding apparatus to form ferric chloride. The ferric chloride catalyzes the oxidative attack on the unsaturated linkages of the resin formed as a result of the dehydrochlorination reaction even more strongly than the hydrogen chloride itself. (2) The plasticizers are themselves unstable at elevated temperatures, particularly the monomeric esters prepared from the branched chain alcohols produced by the "Oxo" process. The problem is especially severe with the "Oxo" product derivatives because of the relatively greater oxidation-susceptibility of the tertiary carbon atoms present therein.

Prior efforts, however, were heretofore directed to the discovery of stabilizers for the vinyl chloride resins themselves. These stabilizers were characterized by their ability to react with the hydrogen chloride liberated in the decomposition of the resin thereby preventing the hydrogen chloride from catalyzing an oxidative attack on the unsaturated linkages formed. However, when monomeric esters were used to plasticize vinyl chloride resins, the stabilization effect obtained with the aforementioned acid acceptor stabilizers was still unsatisfactory as these esters themselves were unstable.

We have now found, however, that the stability of vinyl chloride resins plasticized with a monomeric ester can be increased to a surprising extent by the addition thereto of a bisphenol compound having the general formula:

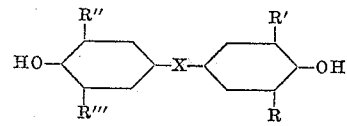

wherein R, R', R", and R''' represent either a hydrogen, chlorine, or alkyl, and X represents either 1-benzyl ethylidene, α-methylbenzylidene, α-phenylbenzylidene, cyclohexylidene, 1,8-menthylene, methylene or 2,2-propylidene and with the provisos that where R, R', R" and R''' represent alkyl groups containing up to 4 carbon atoms, X is methylene or 2,2-propylidene and that when R, R', R" and R''', represent either a hydrogen, chlorine, or alkyl then X represents either 1-benzylethylidene, α-methyl benzylidene, α-phenyl benzylidene, cyclohexylidene or 1,8-menthylene.

The bisphenol stabilizers arrest the degradation of the resin itself, which degradation seems at least to be aggravated by the presence of the monomeric ester plasticizer and also the bisphenol compounds stabilize the plasticizers themselves. The presence of about 0.05 to about 5 percent by weight of the novel stabilizers alone is sufficient to prevent degradation of the plasticized vinyl chloride resin thus enabling the said plasticized resin to retain its color characteristics, tensile strength and ultimate elongation, particularly at high temperatures. Particularly improved stabilization, however, can be obtained by additions of from about 0.1 to about 0.5 percent. The novel bisphenol stabilizers are also advantageous as they improve the electrical properties of the plasticized vinyl chloride resin compositions, as manifested by a high volume resistivity.

Illustrative of the bisphenol compounds which can be used to stabilize plasticized vinyl chloride resin compositions are the following:

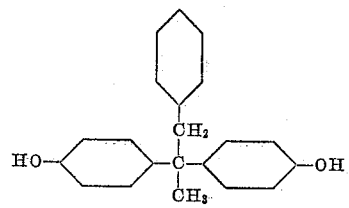

1-phenyl-2,2-bis(p-hydroxyphenyl)propane

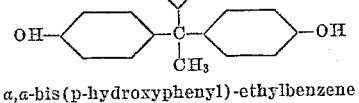
α,α-bis(p-hydroxyphenyl)-ethylbenzene

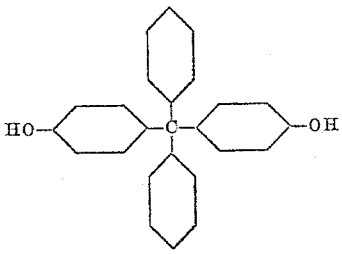
bis(p-hydroxyphenyl)diphenylmethane

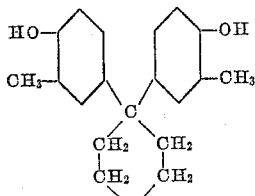
1,1-bis(3-methyl-4-hydroxyphenyl)cyclohexane

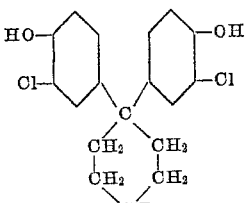
1,1-bis(3-chloro-4-hydroxyphenyl)cyclohexane

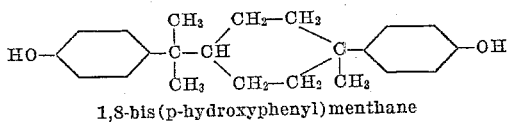
1,8-bis(p-hydroxyphenyl)menthane

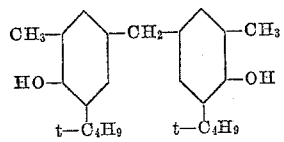
bis(3-methyl-4-hydroxy-5-tertiarybutylphenyl)methane

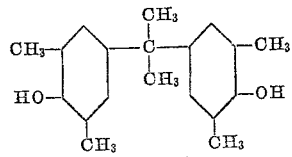
2,2-bis(3,5-dimethyl-4-hydroxyphenyl)propane

Generally the bisphenol compounds are used in combination with a conventional acceptor type stabilizer.

While these compounds can themselves impart an increased degree of stabilization to the plasticized vinyl chloride resin, it has been found that the sum of the two stabilizers, when used in combination, gives an effect which greatly exceeds the sum of the effect produced by each type of stabilizer individually. In particular, about 0.5 to about 5 percent by weight of a hydrogen chloride acceptor in addition to the bisphenol compounds have been found most advantageous. The improvement obtained in stabilization of vinyl chloride resins plasticized with a monomeric ester by the addition to the modified vinyl resin composition of a bisphenol compound of the type previously described, in combination with a conventional acid acceptor type stabilizer is most surprising since even a large amount of the bisphenol stabilizer by itself does not protect the resin fully from discoloration. Conversely a relatively large amount of a conventional acid acceptor type stabilizer alone also does not fully protect the plasticized resin from deterioration. Moreover, high concentrations of a conventional stabilizer of the acid acceptor type, for example, metal containing compounds are frequently undesirable because they impair the clarity and transparency of the resin when present in concentrations of about 8 percent by weight based on the weight of the resin.

All proportions and percentages used in this specification and appended claims are based on the weight of the vinyl chloride resin unless otherwise stated.

Illustrative of compounds which are acid acceptors and can be used in combination with the bisphenol stabilizer are the basically reacting metal containing compounds of the second and fourth group of the periodic table such as the basic lead salts, tin compounds, barium salts of organic acids; also alkaline metal salts of weak organic acids of about 4 to 18 carbon atoms. Specific compounds include the following: dibasic lead stearate, lead orthosilicate, coprecipitated lead orthosilicate and silica gel, normal lead salicylate, monohydrous tribasic lead maleate, barium ricinoleate, barium ricinoleate modified with 2-ethyl hexanoic acid, dibasic lead carbonate, sodium citrate, monohydrous tribasic lead sulphate, dibasic lead phosphate, dibasic lead phthalate, dibutyl tin dilaurate, cadmium naththenate, dibutyl tin diacetate, basic lead hydroxylnaphthenate, various organic strontium salts such as strontium naphthenate, certain sodium organo phosphate compositions known as "Vanstay" (chemical analysis: 16.67% Na, 8.33% P, 49.12% ash); and also certain boron compounds such as Stabelon A (chemical analysis: 9.17% Na; 5.21% B; 3.59% P; 7.78% Ca; 53.33% ash), zinc 2-ethyl hexoate and calcium stearate.

Other stabilizers characterized by their ability to react with the hydrogen chloride liberated in the decomposition of the resin include epoxidized soybean oil, epoxidized butyl stearate, epoxidized pentyl stearate, epoxidized hexyl stearate, epoxidized heptyl stearate, epoxidized octyl stearate, 2-acetoxyethyl 9,10-epoxy-12 acetooxyoctadecanoate, 2-propionyloxyethyl 9,10-epoxy-11-acetoxyoctadecanoate, diglycidyl ether of 2,2-bis(p-hydroxyphenyl)propane and other such epoxy compounds.

By the term vinyl chloride resin as used herein is meant vinyl chloride polymers and vinyl chloride copolymers, wherein the vinyl chloride is copolymerized with other ethylenically usaturated compounds, provided said copolymers contain at least about 10 percent by weight of vinyl chloride. Ethylenically unsaturated compounds which can be copolymerized with vinyl chloride include vinylidene halides such as vinylidene chloride and vinylidene bromide; vinyl esters such as vinyl acetate, vinyl propionate, vinyl butyrate, vinyl chloroacetate, vinyl chloropropionate, vinyl benzoate, vinyl chlorobenzoate; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethyl hexyl acrylate, n-decyl acrylate, methyl methacrylate, butyl methacrylate, methyl ethacrylate, ethyl ethacrylate, acrylamide, N-methyl acrylamide, N,N-di-methylacrylamide, methacrylamide, N-methyl methacrylamide N,N-dimethyl methacrylamide, acrylonitrile, chloroacrylonitrile, methacrylonitrile, ethacrylonitrile; vinyl aromatic compounds such as styrene, dichlorostyrene, vinyl naphthalene; alkyl esters of maleic and fumaric acid such as dimethyl maleate, diethyl maleate; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone; also vinyl pyridine, N-vinyl carbazole, N-vinyl pyrrolidene, ethyl methylene malonate, isobutylene, ethylene, trichloroethylene and various other ethylenically unsaturated compounds.

Among the monomeric ester plasticizers coming within the scope of this invention include the esters obtained from the reaction of a carboxylic acid and an alcohol particularly the branched chain alcohols having from 4 to 12 carbon atoms. Among the polycarboxylic acids which may be used to react with the polyhydric alcohols are oxalic, malonic, succinic, glutaric, sebacic, adipic, pimelic, suberic, azelaic, tricarballylic, citric, tartaric and butane tricarboxylic acid. Unsaturated polycarboxylic acids which can be used include maleic, fumaric, itaconic and citraconic. Phthalic, tetrahydrophthalic, tetrachlorophthalic and terephthalic acids isophthalic can also be used. Other acids which can be used are butyric, caproic, caprylic, capric, lauric, myristic, palmitic, stearic, and oleic and also phosphoric, carbonic, glycolic, and decanoic acids.

These acids, comparable acids and their anhydrides can also be used either singly or in combination with one another.

The alcohols which are suitable for reaction with the aforementioned acids and acid anhydrides include among others the following: propylene glycol, ethylene glycol, butylene glycol, pinacol, trimethylol propane, mannitol, dulcitol, sorbitol, pentaerythritol, dipentaerythritol, 2-ethyl hexyl alcohol, 2-ethylhexane-1,3- diol, isooctyl alcohol, isoheptyl alcohol, isononyl alcohol, isodecyl alcohol, triisooctyl alcohol, isotridecyl alcohol, 2-propyl-4-methylpentyl alcohol, propylheptyl alcohol, n-butanol, n-octanol-2, benzyl alcohol, phenol, cresols and the synthetic alcohols produced by the well known "Oxo" process. The alcohols can be used singly or in combination with one another.

Illustrative descriptions of the "Oxo" process can be found in U.S. Patent 2,327,066 and in the U.S. Bureau of Mines publication "RI 4270," Critical Review of Chemistry of the Oxo Synthesis (1948). Description of various typical esters derived from the "Oxo" alcohols and the preparation of these esters can be found in U.S. Patent 2,625,527.

Illustrative of specific monomeric esters which can be used to plasticize vinyl chloride resins include diisooctyl sebacate, di-isooctyl azelate, di-isoheptyl sebacate, di-isononyl adipate, di-isooctyl tetrahydrophthalate, triisooctyl aconitate, triisooctyl phosphate, diisodecyl glycolate, diisoctyladipate, di-isoheptyl phthalate, diisononyl phthalate, tri-isooctyl tri-carballylate, di-isotridecyl maleate, di-isotridecyl carbonate, di-isotridecyl oxalate, isotridecyl laurate, isotridecyl isotridecanoate, 2-ethyl hexyl "Oxo" decyl phthalate, and di-"Oxo" decyl phthalate, and 2-ethylhexane-1,3 diol adipate. The alcohols used in preparing 2-ethyl hexyl "Oxo" decyl phthalate and di-"Oxo" decyl phthalate were produced by the "Oxo" process.

The monomeric esters are used in amounts ranging from about 2 to 100 percent by weight based on the weight of the vinyl chloride resin.

It is also to be understood that other ingredients such as pigments, dyes, fillers, flame retardants and also so called "plasticizer extenders" can be incorporated into the vinyl chloride resin compositions by any convenient manner, for example by milling on hot rolls or in a Banbury mixer. A "plasticizer extender" is a compound which is itself a plasticizer but is not compatible in large amounts with the resin composition to which it is added. It is used as an economic measure to decrease the amount of relatively more expensive linear polyester and monomeric ester plasticizers in the polyvinyl chloride resin compositions.

The present invention is further illustrated by the following examples wherein the polyvinyl chloride resin of Examples I and II was a polyvinyl chloride resin having a specific viscosity of from 0.175 to 0.195 at 20° C. as determined on a sample comprising 0.2 gram of resin per 100 milliliters of nitrobenzene. The resin of Example III was a vinyl chloride-vinyl acetate copolymer having a specific viscosity of from 0.200 to 0.215 at 20° C. as determined on a sample comprising 0.2 gram of resin per 100 milliliters of nitrobenzene.

EXAMPLE I

Compositions whose formulations are shown in Table No. I were each blended for five minutes, fluxed in a Banbury mixer and thereafter sheeted and rolled on a two roll mill at 170° C., the roll mill opening being 0.040 inch. 0.075 inch thick plaques were then molded from these compositions and each plaque subjected to a test to determine its volume resistivity. Data obtained is shown in Table No. I wherein all proportions are in parts by weight.

Table No. I

| Composition | Control | No. 1 | No. 2 | No. 3 | No. 4 | No. 5 | No. 6 | No. 7 | No. 8 |
|---|---|---|---|---|---|---|---|---|---|
| Polyvinyl chloride resin | 48.00 | 48.00 | 48.00 | 48.00 | 48.00 | 48.00 | 48.00 | 48.00 | 48.00 |
| Di "Oxo" decylphthalate | 24.50 | 24.50 | 24.50 | 24.50 | 24.50 | 24.50 | 24.50 | 24.50 | 24.50 |
| 40% chlorinated paraffin (plasticizer extender) | 5.00 | 5.00 | 5.00 | 5.00 | 5.00 | 5.00 | 5.00 | 5.00 | 5.00 |
| Epoxidized soybean oil | 2.00 | 2.00 | 2.00 | 2.00 | 2.00 | 2.00 | 2.00 | 2.00 | 2.00 |
| Calcium carbonate | 11.25 | 11.25 | 11.25 | 11.25 | 11.25 | 11.25 | 11.25 | 11.25 | 11.25 |
| Calcined clay | 6.80 | 6.80 | 6.80 | 6.80 | 6.80 | 6.80 | 6.80 | 6.80 | 6.80 |
| Basic lead silicate sulfate | 2.00 | 2.00 | 2.00 | 2.00 | 2.00 | 2.00 | 2.00 | 2.00 | 2.00 |
| Stearic acid | 0.25 | 0.25 | 0.25 | 0.25 | 0.25 | 0.25 | 0.25 | 0.25 | 0.25 |
| 2,2-bis(p-hydroxyphenyl) propane | 0.20 | | | | | | | | |
| α,α-Bis(p-hydroxyphenyl) ethyl benzene | | 0.20 | | | | | | | |
| Bis(3-methyl,4-hydroxy 5-tertiary butylphenyl) methane | | | 0.20 | | | | | | |
| 1,1-bis(3-methyl-4-hydroxyphenyl) cyclohexane | | | | 0.20 | | | | | |
| 1,1-bis(3-chloro-4-hydroxyphenyl) cyclohexane | | | | | 0.20 | | | | |
| Bis(p-hydroxyphenyl) diphenyl methane | | | | | | 0.20 | | | |
| 1-phenyl-2,2-bis(p-hydroxyphenyl) propane | | | | | | | 0.20 | | |
| 2,2-bis(3,5-dimethyl-4-hydroxyphenyl) propane | | | | | | | | 0.20 | |
| 1,8-bis(p-hydroxyphenyl) menthane | | | | | | | | | 0.20 |
| Volume resistivity at 50° C. (ASTM-D-257-52) (megohm-cm.) | 7.0·10⁵ | 12.7·10⁵ | 16.3·10⁵ | 13.7·10⁵ | 14.5·10⁵ | 13.4·10⁵ | 13.3·10⁵ | 15.3·10⁵ | 15.4·10⁵ |

The results tabulated in Table No. I clearly show the superior electrical properties conferred by the bisphenols of this invention on polyvinyl chloride resin compositions plasticized with a monomeric ester. Superior electrical properties are evidenced by a high volume resistivity. Using a conventional stabilizer, 2,2-bis(p-hydroxyphenyl) propane, in these compositions lowers the volume resistivity as indicated by the "control" composition.

EXAMPLE II

Compositions whose formulations are shown below were compounded and molded into plaques precisely in the same fashion as described in Example I. The plaques were subjected to tests to determine (1) tensile strength before and after high temperature aging; (2) ultimate elongation before and after high temperature aging. Data obtained is shown in Table No. II wherein all proportions are in parts by weight.

Table No. II

| Composition | Control | No. 1 | No. 2 | No. 3 | No. 4 | No. 5 | No. 6 | No. 7 | No. 8 |
|---|---|---|---|---|---|---|---|---|---|
| Polyvinyl chloride resin | 48.20 | 48.00 | 48.00 | 48.00 | 48.00 | 48.00 | 48.00 | 48.00 | 48.00 |
| Di "Oxo" decylphthalate | 24.50 | 24.50 | 24.50 | 24.50 | 24.50 | 24.50 | 24.50 | 24.50 | 24.50 |
| 40% chlorinated paraffin (plasticizer extender) | 5.00 | 5.00 | 5.00 | 5.00 | 5.00 | 5.00 | 5.00 | 5.00 | 5.00 |
| Epoxidized soybean oil | 2.00 | 2.00 | 2.00 | 2.00 | 2.00 | 2.00 | 2.00 | 2.00 | 2.00 |
| Calcium carbonate | 11.25 | 11.25 | 11.25 | 11.25 | 11.25 | 11.25 | 11.25 | 11.25 | 11.25 |
| Calcined clay | 6.80 | 6.80 | 6.80 | 6.80 | 6.80 | 6.80 | 6.80 | 6.80 | 6.80 |
| Basic lead silicate sulfate | 2.00 | 2.00 | 2.00 | 2.00 | 2.00 | 2.00 | 2.00 | 2.00 | 2.00 |
| Stearic acid | 0.25 | 0.25 | 0.25 | 0.25 | 0.25 | 0.25 | 0.25 | 0.25 | 0.25 |
| α,α-Bis(p-hydroxyphenyl) ethyl benzene | | 0.20 | | | | | | | |
| Bis(3-methyl,4-hydroxy 5-tertiary butylphenyl) methane | | | 0.20 | | | | | | |
| 1,1-Bis(3-methyl-4-hydroxyphenyl) cyclohexane | | | | 0.20 | | | | | |
| 1,1-Bis(3-chloro-4-hydroxyphenyl) cyclohexane | | | | | 0.20 | | | | |
| Bis(p-hydroxyphenyl) diphenyl methane | | | | | | 0.20 | | | |
| 1-Phenyl-2,2-bis(p-hydroxyphenyl) propane | | | | | | | 0.20 | | |
| 2,2-Bis(3,5-dimethyl-4-hydroxyphenyl) propane | | | | | | | | 0.20 | |
| 1,8-Bis(p-hydroxyphenyl) menthane | | | | | | | | | 0.20 |
| PROPERTIES | | | | | | | | | |
| Tensile strength (p.s.i.), ASTM-D-412-51T: | | | | | | | | | |
| Original | 2,170 | 2,490 | 2,450 | 2,370 | 2,260 | 2,370 | 2,360 | 2,330 | 2,330 |
| Oven aged for 7 days at 120° C | 1,870 | 2,430 | 2,370 | 2,310 | 2,340 | 2,260 | 2,260 | 2,270 | 2,350 |
| Ultimate elongation (percent), ASTM-D-412-51T: | | | | | | | | | |
| Original | 325 | 310 | 320 | 295 | 305 | 335 | 325 | 305 | 315 |
| Oven aged for 7 days at 120° C | 60 | 305 | 315 | 305 | 310 | 310 | 310 | 330 | 320 |
| Percent elongation retained | 17.9 | 98 | 98 | 103 | 102 | 92 | 95 | 108 | 102 |

An analysis of the data of Table II shows that vinyl chloride resin compositions containing the bisphenols of this invention have a high retention of their tensile strength after high temperature aging, in fact in some instances the tensile strength is actually improved. Also these compositions retained and in some cases improved their ultimate elongation after oven aging for 7 days at 120° C. In addition, compositions devoid of the bisphenols of this invention tended to lose their color characteristics while those containing the aforementioned bisphenols retained their color characteristics.

EXAMPLE III

The compositions whose formulations are shown in Table No. III were each blended for 10 minutes at room temperature, then fluxed in a Banbury mixer for 5 minutes and discharged at a temperature of 140° C. The fluxed mass was passed 6 times in a two-roll mill at 150° C., taken off as a ⅛ inch thick sheet and granulated. The material was subsequently extruded onto a #14 bare copper wire to a thickness 1/32 of an inch. Tensile strength and ultimate elongation were measured on sections of the coating after removal of the wire, by the test method described in "Standards for Thermoplastic-Insulated Wires," Underwriters Laboratories, Inc., February 1955. All proportions are in parts by weight.

Table No. III

| Composition | Control | No. 1 | No. 2 |
|---|---|---|---|
| Vinyl chloride-vinyl acetate copolymer | 50.75 | 50.50 | 50.50 |
| Di-"Oxo" decyl phthalate | 21.00 | 21.00 | 21.00 |
| Epoxidized soybean oil | 3.00 | 3.00 | 3.00 |
| Hydrogenated acetylated caster oil (plasticizer extender) | 3.00 | 3.00 | 3.00 |
| Liquid alpha methylstyrene polymer (plasticizer extender) | 3.00 | 3.00 | 3.00 |
| Calcium carbonate | 12.00 | 12.00 | 12.00 |
| Calcined clay | 6.00 | 6.00 | 6.00 |
| Stearic acid | 0.25 | 0.25 | 0.25 |
| Tribasic lead sulfate | 1.00 | 1.00 | 1.00 |
| α,α-Bis(p-hydroxyphenyl) ethyl benzene | | 0.25 | |
| 1,1-bis(3-methyl-4-hydroxyphenyl) cyclohexane | | | 0.25 |
| PROPERTIES | | | |
| Tensile strength (p.s.i.) | 2,760 | 2,880 | 2,860 |
| Ultimate elongation (percent) | 305 | 330 | 320 |
| Percent elongation retained after oven aging for 5 days at 120° C | 56 | 82 | 77 |
| Appearance: Oven aged for 5 days at 120° C | (¹) | (²) | (²) |

¹ Turned dark brown.
² Both of the compositions containing the bisphenols of this invention retained their color characteristics.

The data of Table No. III clearly shows that the bisphenol compounds of this invention are effective in improving the retention of the ultimate elongation of a vinyl chloride resin after high temperature aging. Vinyl chloride resin compositions containing these compounds also retained their color characteristics after high temperature aging. In addition the bisphenols of this invention improved the tensile strength of the vinyl resin compositions.

The foregoing examples serve only to illustrate the present invention. It is to be understood that this invention is not restricted thereto and numerous variations may be devised without departing from the scope and spirit thereof.

What is claimed is:

1. A plasticized and stabilized composition comprising a vinyl chloride resin, a monomeric ester plasticizer which is formed from the reaction of an alcohol and a compound selected from the group consisting of a carboxylic acid and a carboxylic acid anhydride and a bisphenol having the general formula:

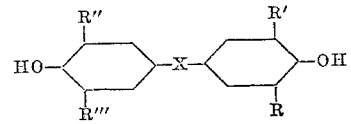

wherein R, R', R" and R'" are selected from the group consisting of hydrogen, chlorine and alkyl when X is selected from the group consisting of 1-benzylethylidene, α-methylbenzylidene, α-phenylbenzylidene, cyclohexylidene and 1,8 menthylene, and wherein R, R', R" and R'" are alkyl groups containing up to 4 carbon atoms when X is selected from the group consisting of methylene and 2,2-propylidene said bisphenol being present in an amount of at least about 0.05 percent by weight based on the weight of said vinyl chloride resin.

2. A composition as defined in claim 1 wherein the bisphenol is 1-phenyl-2,2-bis(p-hydroxyphenyl)propane.

3. A composition as defined in claim 1 wherein the bisphenol is α,α-bis(p-hydroxyphenyl)ethyl benzene.

4. A composition as defined in claim 1 wherein the bisphenol is bis(p-hydroxyphenyl)diphenylmethane.

5. A composition as defined in claim 1 wherein the bisphenol is 1,1-bis(3-methyl-4-hydroxyphenyl)cyclohexane.

6. A composition as defined in claim 1 wherein the bisphenol is 1,1-bis(3-chloro-4-hydroxyphenyl)cyclohexane.

7. A composition as defined in claim 1 wherein the bisphenol is 1,8-bis(p-hydroxyphenyl)menthane.

8. A composition as defined in claim 1 wherein the bisphenol is bis(3-methyl-4-hydroxy-5-tertiary-butylphenyl)methane.

9. A composition as defined in claim 1 wherein the bisphenol is 2,2-bis(3,5-dimethyl-4-hydroxyphenyl)propane.

10. A composition as defined in claim 1 wherein the bisphenol is present in an amount ranging from about 0.1 to 0.5 percent by weight based on the weight of said vinyl chloride resin.

11. A composition as defined in claim 1 wherein the monomeric ester is present in an amount ranging from about 2 to 100 percent by weight based on the weight of said vinyl chloride resin.

12. A plasticized and stabilized composition comprising a vinyl chloride resin, a monomeric ester plasticizer which is formed from the reaction of an alcohol and a compound selected from the group consisting of a carboxylic acid and a carboxylic acid anhydride, an acid acceptor compound, and a bisphenol having the general formula:

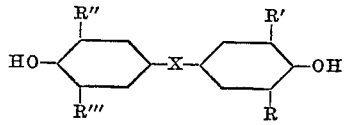

wherein R, R', R" and R''' are selected from the group consisting of hydrogen, chlorine and alkyl when X is selected from the group consisting of 1-benzylethylidene, α-methylbenzylidene, α-phenylbenzylidene, cyclohexylidene and 1,8 menthylene, and wherein R, R', R" and R''' are alkyl groups containing up to 4 carbon atoms when X is selected from the group consisting of methylene and 2,2-propylidene said bisphenol being present in an amount of at least about 0.05 percent by weight based on the weight of said vinyl chloride resin.

13. A composition as defined in claim 12 wherein the acid acceptor compound is present in an amount ranging from about 0.5 to 5 percent by weight based on the weight of said vinyl chloride resin.

14. A composition comprising a vinyl chloride resin and a bisphenol having the general formula:

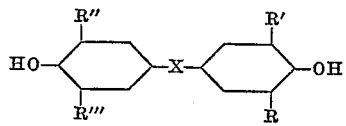

wherein R, R', R" and R''' are selected from the group consisting of hydrogen, chlorine and alkyl when X is selected from the group consisting of 1-benzylethylidene, α-methylbenzylidene, α-phenylbenzylidene, cyclohexylidene and 1,8-menthylene and wherein R, R', R" and R''' are alkyl groups containing up to 4 carbon atoms when X is selected from the group consisting of methylene and 2,2-propylidene, said bisphenol being present in an amount of at least about 0.05 percent by weight based on the weight of said vinyl chloride resin.

15. A composition comprising a vinyl chloride resin and a bisphenol having the general formula:

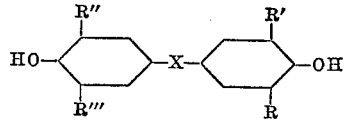

wherein R, R', R" and R''' are selected from the group consisting of hydrogen, chlorine and alkyl and X is selected from the group consisting of 1-benzylethylidene, α-methylbenzylidene, α-phenylbenzylidene, cyclohexylidene, and 1,8-menthylene, said bisphenol being present in an amount of at least about 0.05 percent by weight based on the weight of said vinyl chloride resin.

16. A composition comprising a vinyl chloride resin and a bisphenol having the general formula:

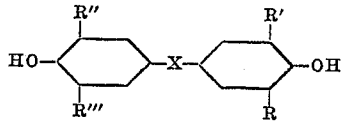

wherein R, R', R" and R''' are alkyl groups containing up to 4 carbon atoms and X is selected from the group consisting of methylene and 2,2-propylidene, said bisphenol being present in an amount of at least 0.05 percent by weight based on the weight of said vinyl chloride resin.

References Cited in the file of this patent

UNITED STATES PATENTS

| | | |
|---|---|---|
| 2,820,774 | Meyers et al. | Jan. 21, 1958 |
| 2,824,079 | Fischer | Feb. 18, 1958 |
| 2,881,151 | Young et al. | Apr. 7, 1959 |